Figure 1:
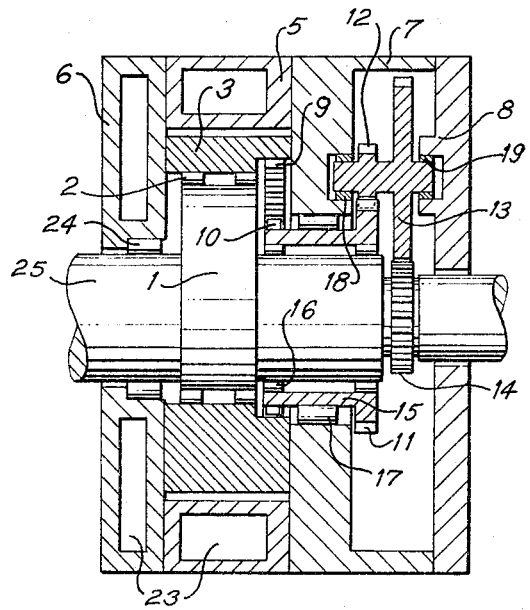

Aug. 23, 1966  M. RADZIWILL ETAL  3,268,156
ENGINE OR POWER DRIVEN MACHINE WITH THE ROTARY PISTON
Filed Nov. 7, 1963

3,268,156
ENGINE OR POWER DRIVEN MACHINE WITH
THE ROTARY PISTON
Maciej Radziwill, Kozietulskiego Str. 2 Fl. 1, and Andrzej
Cezary Broel-Plater, Smolna Str. 14/10, both of
Warsaw, Poland
Filed Nov. 7, 1963, Ser. No. 322,577
Claims priority, application Poland, Nov. 8, 1962,
P 100,013
6 Claims. (Cl. 230—145)

This invention relates to engines or power driven machines having a rotary piston mounted on a crank or on an eccentric of a shaft and connected with the said shaft by means of gears.

Numerous designs of internal combustion engines or of power driven machines are known in which are provided pistons moving with rotational motion around an axis which is itself moving along a circular path. Engines of this kind are known, for example, from Polish Patent No. 43,628. The above engines or power driven machines show many advantages such as, for example, the possibility of obtaining comparatively large amounts of power or a large degree of efficiency of operation in relation to their small dimensions. Moreover there are not used parts which move with reciprocating motion and this facilitates the dynamic balancing of the engine or power driven machine. However, beside these advantages, the above engines and power driven machines also have a number of faults. One of the more serious of these faults is the limitation of diameter of the main shaft of the engine or power driven machine of this type, which limitation is disadvantageous because it does not allow the use of strong enough shafts as a result of which there is limited the possibility of getting high power or efficiency. Besides that there is also limited the possible use of this sort of machine as a compression ignition engine operating according to Diesel or Seiliger techniques. This limitation of the diameter of the main shaft of a machine with rotary pistons, and especially of machines according to the Polish Patent No. 43,628 or the like, is a result of their kinematic arrangement. Namely, in most of the machines of this kind which have been constructed, there is applied a piston having the shape of an equilateral triangle of convex sides, which is mounted in a rotary way on a crank or on an eccentric of the machine's main shaft and which moves with rotational motion in a cylinder having the shape of a trochoid in such a way that all its vertices are continuously in contact with the cylinder walls. This kind of motion of the piston is constrained on one side by turning of the crank or the eccentric of the machine main shaft on which the piston is mounted, and on the other side by a gear of two toothed wheels the larger of which is provided with internal teeth and is connected with the piston, while the smaller externally toothed wheel is mounted in the stationary casing of the machine. The ratio of pitch diameters of the said toothed wheels and also the diameter of the smaller wheel are strictly dependent on the radius of the crank or of the eccentric of the main shaft. Also, for an assumed size of the machine, there must be limited the radius of the eccentric or of the crank of the main shaft because it has been proved that an increasing of the said radius in order to increase pitch diameter of the two above mentioned toothed wheels causes disadvantageous variable accelerations of the piston resulting in highly detrimental vibrations of sealing elements of the piston, and in speeding up of wear of the whole engine. As can be seen from the above, for an assumed size of the machine, the diameter of the smaller toothed wheel in the said gear can not be increased beyond the certain limiting value. In view of the fact that for the design it is required that the smaller toothed wheel of the said machine gear encloses the main shaft, it is obvious that any limitation of the pitch diameter of the said smaller toothed wheel results also in limiting the diameter of the main shaft, which limiting—as has been mentioned above—is disadvantageous as far as strength of the shaft is concerned.

The above fault of the said engines or power driven machines can be eliminated by applying—according to the invention—an additional back gear. These gears are in fact used in some kinds of machines with rotary pistons, but solely in those types of the machines in which both the cylinder and the piston are respectively revolving around two parallel and stationary axes of rotation only, while the said back gears connect the rotating cylinder of the machine with the main shaft rotating around a parallel axis, which shaft forms a unit with the piston in such a way as appears in Polish Patent No. 43,628.

As distinguished from the above described machines, the machine according to the invention is provided with the stationary cylinder inside which there is moving with rotational motion the piston mounted in a rotary way on the eccentric of the main shaft, and machine according to the invention is also provided with the back gear. However, as distinguished from the above mentioned machines this back gear connects the rotary piston mounted in a rotary way on an eccentric or a crank of the main shaft with the said main shaft. In this arrangement it is possible—having suitably selected ratios of the said back gear and of the toothed wheels co-operating with it—to increase the diameter of the main shaft of the machine sufficiently to insure transmission of increased loads, for example in the case of using the machine as a compression ignition engine. Moreover, it is possible to increase the ratio of the piston radius (that is the distance between its center of symmetry and any of its vertices) to the radius of the main shaft eccentric or crank on which the said piston is mounted.

As has been shown by testing and by theoretical studies, the increasing of the said ratio above the value of nine insures that there are eliminated the accelerations of variable direction which appear in the case of other arrangements and which affect particularly the sealing elements fitted in the piston causing quicker wear of the said elements. It is not possible to increase the said ratio in machines with rotary pistons without applying the back gear, because the kinematic requirements of the machines enforce in such case such small dimensions of the toothed wheel mounted in the machine casing, that the machine main shaft passing through the said toothed wheel could not possibly transmit the operational loads of the machine.

Of course the machine according to the invention may be constructed not only in accordance with the kinematic scheme based on co-operation of the piston having the shape of an equilateral triangle of convex sides with the cylinder of the shape of a trochoid, but also in accordance with other kinematic schemes such as, for example, in the machine according to the invention in which the piston having the basic shape of a triangle with convex sides rotates in a cylinder having the basic shape of a square.

Figure 2:
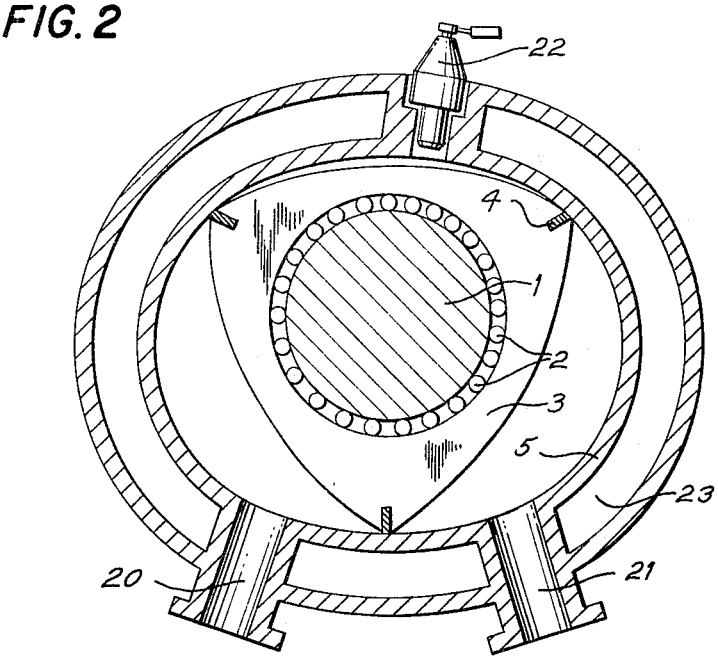

The invention is next explained in relation to the drawing in which:

FIG. 1 is a schematic cross-section of a machine with a rotary piston, which cross-section is made along the main shaft axis; and FIG. 2 is a lateral cross-section of the same machine.

On an eccentric 1 of a main shaft 25 of the machine, there is mounted for rotation—by means of bearings 2— a rotary piston 3. The said piston 3, the cross-section of which has the shape of an equilateral triangle with convex sides, is provided with peripheral sealing elements 4 located on the vertices of the cross-section triangle, and the piston moves with rotational motion inside the cylinder wall 5, the cross-section of which cylinder has the shape of a trochoid. The cylinder wall 5 together with two side plates 6 and 7 and with the front plate 8—which are connected together for example by means of screws —form the casing of the machine.

The rotational motion of the piston 3 in the machine casing is determined on one hand by the rotating motion of the main shaft 25, on the eccentric 1 of which shaft the piston is mounted, and on the other hand the said rotational motion is determined by the rotation motion of the piston around the axis of the eccentric 1 which motion is caused by the gears 9, 10 comprising the stationary internally toothed wheel and the cylindrical toothed wheel moving inside it, as well as by a back gear 11, 12, 13, 14, which two gears connect the main shaft 25 with the piston 3.

The internally toothed wheel or member 9 is fixed to the piston 3 and co-operates with the cylindrical toothed wheel or member 10 fixed on the sleeve 15 on which there is also fixed the toothed wheel 11. The sleeve 15 with the toothed wheels 10 and 11 is rotatably supported on the main shaft by means of bearings 16, and by means of bearings 17 it is also rotatably mounted in the side plate 7 of the machine casing. The toothed wheel 11, which is fixed on the sleeve 15 and which forms a component of the back gear, is in mesh with the toothed wheel 12 fixed to and concentric with the toothed wheel 13. This set of the two toothed wheels 12 and 13 is rotatably mounted by means of bearings 18 and 19 in the plates 7 and 8 of the machine casing. The toothed wheel 13, which has a different diameter and pitch than does wheel 12, is in mesh with the toothed wheel 14 which is keyed on the main shaft 25 of the machine.

The above described transmission, with the suitably chosen ratios for the particular pairs of toothed wheels, insures the required ratio of angular speeds of the main shaft 25 and of the piston 3 which is rotatably mounted on the eccentric of the said main shaft. In the above described example of the machine according to the invention, the said ratio is equal to 3:1.

The piston 3 which is moving with rotational motion in the cylinder 5 forms working chambers of varying volume, which chambers can be used to obtain the thermodynamic cycle of an internal combustion engine. For this purpose, the machine is provided with two channels: an inlet channel 20 and an outlet channel 21, and it is also provided with a known ignition element 22. Instead of the said ignition element 22, there can be also employed a known fuel injector. Chambers 23 provided in components of the machine casing are used for passing a cooling agent while the bearing element 24 is used for supporting the main shaft 25 in the side plate 6 of the machine casing.

Having assumed such parameters of the machine as the ratio of radius of the piston 3 to the radius of the eccentric 1 of the main shaft 25, and the number of vertices of cross-section of the piston 3 as well as the total value of the transmission ratio between the piston 3 and the main shaft 1—which value is connected with the two first assumed parameters—it is possible to choose values of pitch diameters of the toothed wheels 9, 12, 13 and 14 in such a way that the resulting pitch diameters of the toothed wheels 10 and 11 are larger than the assumed diameter of the sleeve 15 while the said assumed total value of the transmission ratio between the piston 3 and the main shaft 1 remains unchanged. The above enables designing the said sleeve so that inside it can be placed a main shaft of any required diameter.

What is claimed is:

1. Apparatus comprising a stationary cylinder, a rotatable main shaft extending into said cylinder, an eccentric fixed on said shaft, a rotary piston, bearings supporting said piston directly on said eccentric, sealing elements peripherally spaced on said piston and engaged against said cylinder and defining with the latter and said piston a plurality of isolated zones, a rotatable member coaxially arranged with respect to said shaft, first and second toothed members in coaxial arrangement respectively fixed on said piston and rotatable member and engaged so that rotation of the piston rotates said rotatable member, a third toothed member, said third toothed member being fixed on said rotatable member and having a pitch which is different from that of said second toothed member, a first rotatable toothed wheel having an axis parallel to said shaft, a second rotatable toothed wheel fixed to and concentric with said first wheel for rotation therewith, said toothed wheels having different diameters and pitches, a further toothed wheel fixed on said main shaft and in engagement with said second wheel, means to supply fuel to said cylinder, means to ignite said fuel in said cylinder, and means to vent the fuel combustion products from the cylinder, the supply of fuel, ignition of fuel and venting of combustion products being effected at angularly spaced zones in the cylinder adapted for being isolated by said sealing elements.

2. Apparatus as claimed in claim 1 wherein the cylinder has an internal cross-section in the shape of a trochoid and said piston has the shape of an equilateral triangle with convex sides, said sealing elements being located at the apices of the triangle.

3. Apparatus as claimed in claim 1, wherein the rotatable member encircles the shaft comprising a bearing between the shaft and rotatable member.

4. Apparatus as claimed in claim 3, wherein the cylinder includes a cylinder wall and first and second side plate thereon, the main shaft extending through said first plate, said shaft with the rotatable member thereon extending through the second plate, said apparatus further comprising a bearing between the second plate and said rotatable member and means in said second plate rotatably supporting said first toothed wheel.

5. Apparatus as claimed in claim 4, comprising a front plate including means rotatably supporting the second toothed wheel and cooperating with the second side plate to confine all of said toothed wheels.

6. Apparatus as claimed in claim 4, whereat at least the cylinder wall and one of the side plates are provided with passages for a coolant.

References Cited by the Examiner

UNITED STATES PATENTS

| 2,947,290 | 8/1960 | Froede | 123—8 |
| 2,988,065 | 6/1961 | Wankel et al. | 123—8 |
| 3,007,460 | 11/1961 | Bentele et al. | 123—8 |
| 3,064,880 | 11/1962 | Wankel et al. | 123—8 |
| 3,117,563 | 1/1964 | Wiegert | 123—14 |

FOREIGN PATENTS 1,319,189   1/1963   France.

MARK NEWMAN, *Primary Examiner.*

WILBUR J. GOODLIN, *Examiner.*

DONLEY J. STOCKING, *Assistant Examiner.*